United States Patent
Ju et al.

(10) Patent No.: US 12,309,151 B2
(45) Date of Patent: May 20, 2025

(54) CREDENTIAL STORAGE MANAGER FOR PROTECTING CREDENTIAL SECURITY DURING DELEGATED ACCOUNT USE

(71) Applicant: PayPal, Inc., San Jose, CA (US)

(72) Inventors: Yona Ju, San Jose, CA (US); Fun-Chen Jou, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 472 days.

(21) Appl. No.: 17/362,687

(22) Filed: Jun. 29, 2021

(65) Prior Publication Data
US 2021/0328990 A1  Oct. 21, 2021

Related U.S. Application Data

(63) Continuation of application No. 16/237,551, filed on Dec. 31, 2018, now Pat. No. 11,050,749.

(51) Int. Cl.
| | |
|---|---|
| *H04L 29/06* | (2006.01) |
| *G06Q 20/36* | (2012.01) |
| *H04L 9/40* | (2022.01) |

(52) U.S. Cl.
CPC ..... *H04L 63/0884* (2013.01); *G06Q 20/3674* (2013.01); *H04L 63/0876* (2013.01); *H04L 63/0892* (2013.01)

(58) Field of Classification Search
None
See application file for complete search history.

(56) References Cited

U.S. PATENT DOCUMENTS

| | | |
|---|---|---|
| 8,607,306 B1 | 12/2013 | Bridge et al. |
| 9,391,996 B1 | 7/2016 | Chin et al. |
| 9,450,958 B1 | 9/2016 | Saylor et al. |
| 9,652,604 B1 * | 5/2017 | Johansson ............. H04W 4/021 |
| 9,800,525 B1 | 10/2017 | Lerner et al. |
| 10,505,914 B2 | 12/2019 | Hitchcock et al. |
| 11,100,504 B2 | 8/2021 | Ju et al. |

(Continued)

OTHER PUBLICATIONS

"Intro to Passpack" found at https://www.youtube.com/watch?v=QM HrbxQKG9k, author unknown, 2009 (Year: 2009).*

(Continued)

*Primary Examiner* — Piotr Poltorak
(74) *Attorney, Agent, or Firm* — Haynes and Boone, LLP

(57) ABSTRACT

There are provided systems and methods for a credential storage manager for protecting credential security during delegated account use. A first user that controls the account may delegate usage of the account to a second user through a credential manager of a transaction process that manages sensitive authentication information and delegates account usage. The credential manager may automatically fill authentication information for use of the account by the second user. A device fingerprint of a device of the second user may be used to provide risk prevention and access the account. The credential manager may prevent revealing of the credentials and navigation to sensitive data or processes with the account. Two-factor authentication may be performed by receiving a code in a message received by a device of the first user, scraping the code from the message, and entering the code to a device of the second user.

20 Claims, 5 Drawing Sheets

(56) References Cited

U.S. PATENT DOCUMENTS

| | | |
|---|---|---|
| 2004/0117493 A1 | 6/2004 | Bazot et al. |
| 2006/0075253 A1 | 4/2006 | Sonkin et al. |
| 2007/0043667 A1 | 2/2007 | Qawami et al. |
| 2008/0059804 A1 | 3/2008 | Shah et al. |
| 2008/0313731 A1* | 12/2008 | Iftimie ................ G06F 21/6218 726/18 |
| 2009/0172793 A1 | 7/2009 | Newstadt et al. |
| 2010/0306547 A1 | 12/2010 | Fallows et al. |
| 2011/0167479 A1* | 7/2011 | Maes .................... H04L 9/3213 726/4 |
| 2012/0317624 A1 | 12/2012 | Monjas Llorente et al. |
| 2013/0019295 A1* | 1/2013 | Park ................... H04L 63/0807 726/7 |
| 2014/0089158 A1 | 3/2014 | Chen et al. |
| 2014/0164254 A1 | 6/2014 | Dimmick |
| 2014/0258010 A1* | 9/2014 | Mardikar ............. G06Q 20/202 705/21 |
| 2015/0007269 A1* | 1/2015 | Brugger ................ H04L 67/535 726/4 |
| 2016/0019536 A1 | 1/2016 | Ortiz et al. |
| 2016/0072839 A1 | 3/2016 | Mortimore, Jr. |
| 2016/0342992 A1 | 11/2016 | Lee |
| 2016/0344735 A1 | 11/2016 | Blinn et al. |
| 2017/0019402 A1 | 1/2017 | Kulkarni |
| 2017/0064550 A1 | 3/2017 | Sundaresan et al. |
| 2017/0169424 A1 | 6/2017 | Maddocks et al. |
| 2017/0359345 A1 | 12/2017 | Gangadharan et al. |
| 2018/0103032 A1* | 4/2018 | Bisantz ............... H04L 63/0823 |
| 2018/0183802 A1 | 6/2018 | Choyi et al. |
| 2020/0211016 A1 | 7/2020 | Ju et al. |

OTHER PUBLICATIONS

"Passpack Group Sharing", found at https://www.youtube.com/watch?v=IgAfB4b8luo, author unknown, 2011 (Year: 2011).*

Coding Horror, "Your Session Has Time Out", author unknown, Apr. 2008 found at https://blog.codinghorror.com/your-session-has-timed-out/ (Year: 2008).*

International Application No. PCT/US2019/069005, International Preliminary Report on Patentability mailed on Jul. 15, 2021, 8 pages.

International Application No. PCT/US2019/069005, International Search Report and Written Opinion mailed on Mar. 25, 2020, 9 pages.

Extended European Search Report for Application No. 19907893.2 mailed on Nov. 23, 2021, 13 pages.

Communication pursuant to Article 94(3) EPC for European Application No. 19907893.2 mailed on Jul. 19, 2023, 6 pages.

* cited by examiner

CREDENTIAL STORAGE MANAGER FOR PROTECTING CREDENTIAL SECURITY DURING DELEGATED ACCOUNT USE

CROSS REFERENCE TO RELATED APPLICATIONS

This application is a Continuation of U.S. patent application Ser. No. 16/237,551, filed Dec. 31, 2018, which is incorporated by reference in its entirety.

TECHNICAL FIELD

The present application generally relates to cross-device delegated account usage and more specifically to providing a password storage handler and delegation service that allows for providing account access without having to share authentication credentials or other sensitive account data.

BACKGROUND

Various types of service providers may provide services to users, merchants, other entities, including sale of goods and services (e.g., an "item" or "items"). These service providers may require payment for these items, which may be performed through an account with the merchant or service provider. For example, merchants and service providers may provide online platforms and accounts to users for use in processing transactions electronically. The online platforms may further store information for financial instruments associated with the accounts that are used to process the transactions. However, this requires the user to have an online account for transaction processing and store sensitive information (e.g., personal and/or financial information) with the accounts and platforms. If another user gains access to this account, then the user risks exposure of this sensitive information and may lead to theft and abuse of this information. However, a user may sometimes wish to allow others to utilize their account for specific services and/or payment but may not want to disclose their authentication credentials and sensitive information to others.

Figure 1:
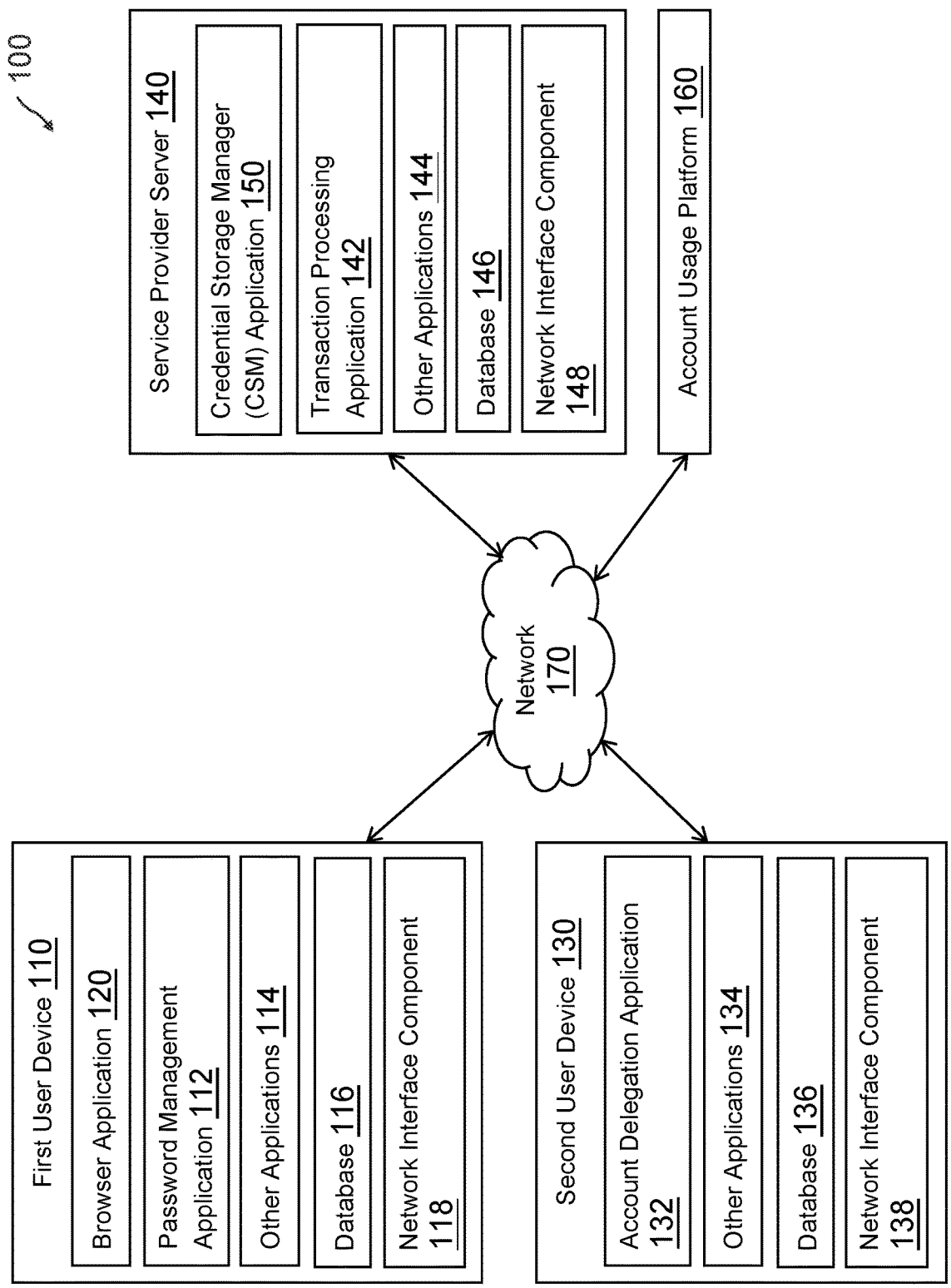
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a credential storage manager for protecting credential security during delegated account use. Systems suitable for practicing methods of the present disclosure are also provided.

In some embodiments, a transaction processor that provides a credential storage manager may provide account, account management, and/or additional services, including electronic transaction processing for online transactions with merchants and service providers. In some embodiments, the account may be provided by the transaction processor directly, such as a payment account. However, in other embodiments, the account may be provided by a merchant for use specifically with their online merchant platform, applications, and affiliates. During creation of the account, the user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide funds to the account and/or an instrument for transaction processing. The user may also be required to select an account name and/or provide authentication credentials, such as a password, personal identification number (PIN), answers to security questions, and/or other authentication information. However, not all information may be necessary in all embodiments. The user's account may then be used by the user to perform online interactions and activities. In some embodiments, this may include electronic transaction processing, messaging, social networking, content access, etc. In various embodiments, a website may provide the online services, and thus may be accessed by a web browser application through the account. The application (or website) may be associated with a payment provider, such as PayPal® or other online payment provider service, which may provide payments and the other aforementioned transaction processing services on behalf of users, merchants, and other entities. In some embodiments, a dedicated application may also be utilized to access the account and perform online interactions.

Thus, an account of a first user may include sensitive information, including personal information, financial information, and/or authentication information. A second user may request to utilize the first user's account, or the first user may wish to delegate some usage of the first user's account to the second user, such as an amount of purchasing power the second user has using the account. For example, friends or family members may wish to delegate usage to each other to allow for others to buy items knowing they will be reimbursed or as a gift for the other user. Roommates may wish to utilize one account to purchase shared items or pay for shared bills. If the first user were to provide the account credentials to the second user directly, the second user may act fraudulently, or the first user may risk disclosure of sensitive information to the second user.

Thus, the first user may utilize a credential storage manager (CSM) provided by the transaction processor or another entity (including a merchant providing the account) to establish a delegate account usage for the second user and terms on account usage by the second user. The first user may access an interface of the CSM to delegate account usage to the second user and place terms or conditions on account usage. The terms, settings, or conditions for account usage may govern the allowable account actions taken by the second user, and may be set by the first user when establishing the delegated use or automatically set by the CSM of the transaction processor. The terms may include a length of account use by the second user, actions taken by the second user using the account, a maximum amount or number of purchases using the account, items purchasable using the account, and/or data accessible from the account (e.g., accessible account data). The first user may also identify the second user and/or a device of the second user using an identifier. Once the information is entered, the first user may request that the second user receive the delegated use, at which time the second user may be alerted of the delegated use through an application on a device of the second user. The device may populate a push notification, message, banner notification, or other alert of the allowed delegated use for the account, which may allow the second user to select the account for use with one or more online platforms. The data may be populated using the application and/or an extension added on to another application that is associated with the CSM.

Thus, the second user may receive a delegated account usage permission, which may enable the second user to access the first user's account and utilize the account within the parameters and terms set by the first user and/or CSM. The second user may access an online platform to utilize the first user's account. The online platform may correspond to a merchant or other type of service provider that provides goods or services that may be purchased through electronic transaction processing through the account. The online entity may provide the online platform that allows the user to provide a payment for a bill electronically using the account. The account may also be used with other types of online platforms to perform online activities, such as messaging, email, social networking, media playback, etc. The second user may utilize an application or extension on the second user's device that is associated with the CSM to select the first user's account for login and use with the online platform, which may be displayed in an interface, through menu options, and/or input by the second user (e.g., by providing an account identifier, such as a login username, email address, etc.).

The CSM may automatically fill the sensitive authentication information (e.g., a login identifier, password, and/or PIN). This may be done through a secure background process, where the credential information is filled by one or more processes of the CSM on the second user's device and/or with the online platform. For example, the CSM application and/or extension may retrieve secure credentials from the transaction processor or other account platform and may automatically fill them into an authentication field while preventing revelation of the credentials (e.g., by obscuring the credentials, logging in without showing the credentials, or making unreadable through substitution of other elements). The CSM may also log the second user's device into the account with the online platform directly through processing an authentication of the second user's device for the account with the online platform and allowing the second user's device to access the online platform through the account. This may be done through backend processing by the CSM with the online platform.

In some embodiments, the application and/or extension for the CSM may function to interact with the transaction processor and/or account platform that provides the account to perform the automated login for the first user's account on the second user's device. Thus, the second user is not required to know and enter authentication credentials for the first user's account and the first user may keep those as secure during delegated use of the first user's account for the second user. In some embodiments, two-factor authentication may be set up and required for use of the first user's account, which may be general or specifically required for the second user's delegated use. Two-factor authentication may work by having the account provider send a message having an unknown code (e.g., the unknown authentication data versus the known authentication credentials) to a device, where the unknown code is required to be entered during the authentication request. In some embodiments, a code may be sent to the second user's device, which the second user may directly enter during login of the first user's account. The application or extension on the second user's device may also scrape or determine information sent in text or push message to the second user's device that includes the code and may enter the code to the authentication request processed by the CSM with the application/extension. Additionally, a device of the first user may instead receive the message having the two-factor authentication code, where a similar application or extension of the CSM may scrape the data from the message sent to the first user's device and enter the two-factor authentication code to the authentication request on the second user's device or with the online platform.

During use of the first user's account by the second user, the second user's login session may be tracked so that the CSM and online platform may enforce the terms and parameters on use of the first user's account by the second user. The CSM may track the usage of the first user's account by the second user using a device fingerprint of the second user's device. The device fingerprint may be determined when the second user's device logs in to the first user's account through the CSM, or may be determined when the first user delegates account usage to the second user and a notification is sent to the second user's device. In this regard, determining the fingerprint when the second user is delegated account usage (e.g., prior to the login) may allow the CSM to further determine a risk rating of login of the second user to the account by matching the previously determined fingerprint to the device requesting the login of the first user's account based on the delegated use to the second user. A timestamp of login to the account by the second user's device may also be used to track the second user's use of the first user's account on the online platform, as well as a session identifier (ID) that may be generated for the specific session. In some embodiments, the CSM may also insert a cookie or "supercookie" (e.g., a permanently stored browser cookie on a device or in a more redundant manner that prevents or makes removal more difficult) on the second user's device. This cookie may then be used to track the second user's session, which may be done through the application and/or extension on the device.

During the second user's session, the actions and activities of the second user using the first user's account may be tracked. This may include items that the second user adds for purchase and/or attempts to purchase through the first user's account. If the items, amounts, and/or other transaction data complies with the limitations and terms set on use of the first user's account for transaction processing by the second user, then the CSM may allow the account usage and the second user may process a transaction using the first user's account through the online platform. The second user's actions with the first user's account may also include accessed data, navigations to webpages and/or interfaces to view and/or interact with data, messages transmitted using the first user's account, and other data accessed or processed by the second user using the first user's account. Similarly, if such actions are allowed within the limitations and terms on account usage set by the first user and/or the CSM, the CSM may allow the second user to perform such actions. The CSM may also display data specific to the second user to alert the second user that the second user is within a delegated account usage flow of the first user's account, such as an alert, notification, or message of the delegated usage and terms on delegated usage.

However, some of the actions taken by the second user may also be prohibited based on the terms and limitations set by the first user and/or CSM. For example, the second user may attempt to purchase prohibited items or process a transaction over a limit or past a time of delegated use. The second user may also attempt to send a prohibited message or otherwise execute some prohibited task, such as accessing account credentials or changing settings on the account. The CSM may check the limitations and adjudicate the transaction with the limitations to determine whether the use of the account is allowed. If the action is prohibited, the CSM may prevent execution of the task by the online platform using the first user's account. The CSM may also redirect the second user's device to a webpage, application, or notification that informs the second user that the task is prohibited and will not be executed. This may be performed through the application or extension associated with the CSM. The application or extension may prevent execution of the task by the second device and may also populate the notification on the second user's device for display.

Similarly, the second user may attempt to access prohibited information in order to view or change that information. For example, the second user may attempt to view personal or financial information stored with the first user's account. The second user may also attempt to access an interface or process that allows the second user to change or reset authentication credentials. If the user attempts to access this data and/or process using the first user's account, the second user's device may be rerouted to a webpage or interface that prevents the second user from viewing the data and/or executing the process. This may similarly be executed by the application or extension on the second user's device. The second user may be alerted of the violation of the terms. In some embodiments, the first user may also be alerted of the term violations so that the first user may revoke the delegated access if necessary.

In this manner, a transaction processor may utilize provide a credential storage manager or handler that allows delegated use of accounts without revealing authentication credentials and/or exposing sensitive data. This allows use of accounts by other users in a manner that retains account security and allows for control of the account and removal of delegation on account violations. A device fingerprint may also be utilized to enable effective risk prevention measures by detecting use of the account by a device of the delegated user and monitoring account usage. This allows prevention of navigation to sensitive data by the delegated user and implementation on limits of account usage (e.g., limits on payments and spending using the account). The credential storage manager may further provide processes for two-factor authentication through scraping messaging data on a device of the user controlling the account and entering a scraped code to an authentication process on a device of the delegated user. Thus, the credential storage manager may further provide increased security when implementing two-factor authentication for accounts. Delegated users are therefore not required to go through lengthy account setup processes with multiple different service providers or merchants, thereby reducing processing cost and account data storage requirements by the different account providers. The transaction processor may provide specific applications and extensions to detect violations of delegated use and prevent fraud or misuse by the second user.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first user device 110, a second user device 130, a service provider server 140, and an account usage platform 160 in communication over a network 170. First user device 110 may be utilized by a user to access the various features available for first user device 110, which may include processes and/or applications associated with service provider server 140 to receive delegated account usage for an account controlled by another user associated with second user device 130. Service provider server 140 may manage the account usage and may also process transactions during the transaction usage that are within the terms of account usage. Account usage platform 160 may correspond to a platform that the account is utilized with, such as a merchant platform to buy items.

First user device 110, second user device 130, service provider server 140, and account usage platform 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

First user device 110 may be implemented as a communication device that may utilize appropriate hardware and software configured for wired and/or wireless communication with second user device 130, service provider server 140, and/or account usage platform 160. For example, in one embodiment, first user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®.

Although only one communication device is shown, a plurality of communication devices may function similarly.

First user device 110 of FIG. 1 contains a browser application 120, a password management application 112, other applications 114, a database 116, and a network interface component 118. Browser application 120, password management application 112, and other applications 114 may correspond to executable processes, procedures, and/or applications with associated hardware. In other embodiments, first user device 110 may include additional or different modules having specialized hardware and/or software as required.

Browser application 120 may correspond to one or more processes to execute modules and associated devices of first user device 110 to interact with service provider server 140 to receive delegated account access to perform one or more account actions, including performance of electronic transaction processing. In this regard, browser application 120 may correspond to specialized hardware and/or software utilized by first user device 110 to first display delegated account usage data. Browser application 120 and/or password management application 112 may be used to display account information or an identifier to accounts that a first user associated with first user device 110 has delegated access to, and further to allow the first user to select one of the accounts to perform a login. One or more of the accounts may be controlled or owned by a second user associated with second user device 130. The login may be performed by password management application 112 through a background operation with browser application 120 without browser application 120 displaying authentication information. Once logged in to the account, browser application 120 may be used to perform actions and/or interactions with account usage platform 160 using the delegated use of the second user's account. Browser application 120 may correspond to a general browser application configured to retrieve, present, and communicate information over the Internet (e.g., utilize resources on the World Wide Web) or a private network. For example, browser application 120 may provide a web browser, which may send and receive information over network 170, including retrieving website information, presenting the website information to the user, and/or communicating information to the website. However, in other embodiments, browser application 120 may include a dedicated application of service provider server 140 or other entity (e.g., payment provider, etc.), which may be configured to provide services through the application.

Browser application 120 may provide interaction data to service provider server 140 with account usage platform 160 that indicate delegated use of an account, which may be monitored by service provider server 140 to limit the interactions based on terms, conditions, and limitations on account usage set by the second user or the entity managing the account, such as the entity associated with service provider server 140, for the delegated use by the first user. In some embodiments, the interaction data may correspond to purchases, transfers, and/or electronic transaction processing, which may be with account usage platform 160. During processing of a payment or transfer transaction, browser application 120 may be utilized to select payment instrument(s) for use in providing payment for a purchase transaction, transfer, or other financial process. As discussed herein, browser application 120 may utilize a digital wallet or other payment source stored with the account of the second user based on the limitations for delegated use of the account that allows for processing using the account. Browser application 120 may also receive transaction data elements, including a recipient, a transaction amount, and/or items. Service provider server 140 may limit the account usage, as discussed herein, based on the limitations. In this regard, password management application 112 may be used to redirect the user and/or display a notification if the use of the account is not allowed based on the limitations. Browser application 120 may be utilized to view the results of payment, for example, using transaction histories, dispute resolution processes, and other post-transaction process.

Password management application 112 may correspond to one or more processes to execute modules and associated devices of first user device 110 to receive delegated use information for a delegated use of one or more accounts, provide processes to securely log one or more applications, such as browser application 120, into an account with delegated use, and monitor use of the account for enforcement of limitations on account use. In this regard, browser application 120 may correspond to specialized hardware and/or software utilized by first user device 110 to first receive delegate uses of one or more accounts, such as an account of a second user associated with second user device 130. Password management application 112 may function as a standalone application or an application extension that may be added to another application, such as browser application 120, to allow login to delegated use accounts by first user device 110 and monitoring of account use during delegation to enforce rules on account usage. Thus, password management application 112 may provide one or more processes and/or interfaces to display accounts having delegated use options available to a first use associated with first user device 110. The accounts may be selectable or a designation of one of the accounts may be made to perform a login to the account by an application on first user device 110 to interaction with account usage platform 160 based on the delegated use.

Password management application 112 may utilize background process to retrieve credentials for the account, such as a username, password, etc., that is stored by service provider server 140 securely, and enter them to an authentication request having credential fields in the application, such as browser application 120 accessing a website for account login on account usage platform 160. This may be done by hiding or obscuring authentication information so that the sensitive login information is not revealed on first user device 110. Password management application 112 may instead request that the login be performed through a process between service provider server 140 and account usage platform 160 so that first user device 110 is logged in to the account without requiring the first user to enter authentication credentials. Password management application 112 may also track account usage by monitoring actions taken by the first user with the account through an application on first user device 110. Password management application 112 may receive a two-factor authentication code and enter it during login, which may be from a message sent to first user device 110 or second user device 130. Password management application 112 may be used to provide a timestamp or session ID for an account login of a delegated use account, may provide a cookie associated with the login, or may fingerprint first user device 110 for use in tracking the first user's session of use of the delegated account of the second user associated with second user device 130. In some embodiments, the actions may correspond to access requests for data, electronic transaction processing requests, and/or changing of account data. If service provider server 140 determines the actions are prohibited or violate a limitation on the delegated account use, password management application 112 may prevent the actions based on the limitations and/or an instruction from service provider server 140. Additionally, password management application 112 may present a pop-up or redirect an interface or website navigation to a message that alerts the first user of the prohibited use.

In various embodiments, first user device 110 includes other applications 114 as may be desired in particular embodiments to provide features to first user device 110. For example, other applications 114 may include security applications for implementing client-side security features, programmatic client applications for interfacing with appropriate application programming interfaces (APIs) over network 170, or other types of applications. Other applications 114 may also include additional communication applications, such as email, texting, voice, social networking, and IM applications that allow a user to send and receive emails, calls, texts, and other notifications through network 170. Other applications 114 may also include other media viewing applications to consume media content on first user device 110. Other applications 114 may be utilized with password management application 112 to perform a login to a delegated use account. Other applications 114 may include device interfaces and other display modules that may receive input and/or output information. For example, other applications 114 may contain software programs, executable by a processor, including a graphical user interface (GUI) configured to provide an interface to the user.

First user device 110 may further include database 116 stored in a transitory and/or non-transitory memory of first user device 110, which may store various applications and data and be utilized during execution of various modules of first user device 110. Thus, database 116 may include, for example, identifiers (IDs) such as operating system registry entries, cookies associated with browser application 120 and/or other applications 114, IDs associated with hardware of first user device 110, or other appropriate IDs, such as IDs used for payment/user/device authentication or identification. Database 116 may include device identifying data for use in tracking first user device 110 during use of an account, and may also store information on delegated use accounts that are accessible to first user device 110.

First user device 110 includes at least one network interface component 118 adapted to communicate with second user device 130, service provider server 140, and/or account usage platform 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Second user device 130 may be implemented as a communication device that may utilize appropriate hardware and software configured for wired and/or wireless communication with first user device 110, service provider server 140, and/or account usage platform 160. For example, in one embodiment, second user device 130 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Second user device 130 of FIG. 1 contains an account delegation application 132, other applications 134, a database 136, and a network interface component 138. Account delegation application 132 and other applications 134 may correspond to executable processes, procedures, and/or applications with associated hardware. In other embodiments, second user device 130 may include additional or different modules having specialized hardware and/or software as required.

Account delegation application 132 may correspond to one or more processes to execute modules and associated devices of second user device 130 to provide delegated use of an account for a second user associated with second user device 130 to a first user associated with first user device 110. In this regard, account delegation application 132 may correspond to specialized hardware and/or software utilized by second user device 130 to first access one or more processes and/or interfaces to delegate use of an account to the first user, which may be provided by service provider server 140. The second user may select one or more accounts to delegate use to the first user, which may be accounts the second user owns, controls, or has access to through their authentication credentials. Account delegation application 132 may include one or more interfaces to confirm that the second user has the access to the account through entry of the accounts authentication credentials and/or other identity confirmation. The second user may identify the first user and/or first user device 110 to receive the delegated access (e.g., through a name identifier, etc.). The second user may also provide or receive a code required for entry to identify the delegated use of the second user's account. Account delegation application 132 may be used to select terms, limitations, and/or parameters on use of the second user's account, which may limit the delegated use by the first user by service provider application 140 without intervention by the second user. These may correspond to actions taken with the account, electronic transaction processing limits (e.g., on time, items, money, or number), data accessible by the account, or other task performed during the delegated use of the account by the first user through first user device 110. Similar restrictions or limitations may also be provided by the service provider. Once established, service provider server 140 may provide the delegated use to first user device 110, as discussed herein. In some embodiments, account delegation application 132 may be used to scrape messages on second user device 130 for two-factor authentication, and provide a code to allow delegated access on first user device 110.

In some embodiments, account delegation application 132 may be used to update and/or revoke delegated access and use of the account. For example, after the use required by the first user and/or provided by the second user, the second user may request access be revoked through account delegation application 132. Account delegation application 132 may also update the second user of a requested prohibited action taken by the first user with the account and block based on the limitations. In response to this prohibited action, the second user may utilize account delegation application 132 to revoke access to the account. Account delegation application 132 may also be used to change the parameters of the delegated use, such as by extending or shortening a time, increasing or decreasing access or electronic transaction processing rules, or otherwise changing the access. Account delegation application 132 may correspond to a general browser application configured to retrieve, present, and communicate information over the Internet (e.g., utilize resources on the World Wide Web) or a private network. For example, account delegation application 132 may provide a web browser, which may send and receive information over network 170, including retrieving website information, presenting the website information to the user, and/or communicating information to the website. However, in other embodiments, account delegation application 132 may include a dedicated application of service provider server 140 or other entity (e.g., payment provider, etc.), which may be configured to provide services through the application.

In various embodiments, second user device 130 includes other applications 134 as may be desired in particular embodiments to provide features to second user device 130. For example, other applications 134 may include security applications for implementing client-side security features, programmatic client applications for interfacing with appropriate application programming interfaces (APIs) over network 170, or other types of applications. Other applications 134 may also include additional communication applications, such as email, texting, voice and IM applications that allow a user to send and receive emails, calls, texts, and other notifications through network 170. Other applications 134 may include device interfaces and other display modules that may receive input and/or output information. For example, other applications 134 may contain software programs, executable by a processor, including a graphical user interface (GUI) configured to provide an interface to the user.

Second user device 130 may further include database 136 stored in a transitory and/or non-transitory memory of second user device 130, which may store various applications and data and be utilized during execution of various modules of second user device 130. Thus, database 136 may include, for example, identifiers (IDs) such as operating system registry entries, cookies associated with account delegation application 132 and/or other applications 134, IDs associated with hardware of second user device 130, or other appropriate IDs, such as IDs used for payment/user/device authentication or identification. Database 136 may include information on delegate use, as well as account information and account authentication credentials.

Second user device 130 includes at least one network interface component 138 adapted to communicate with first user device 110, service provider server 140, and/or account usage platform 160. In various embodiments, network interface component 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 140 may be maintained, for example, by an online service provider, which may provide online transaction processing services for payment of goods and/or services (e.g., items) through accounts, as well as manage delegated use of the accounts. In this regard, service provider server 140 includes one or more processing applications which may be configured to interact with first user device 110, second user device 130, and/or account usage platform 160 to facilitate transaction processing for purchase of items through delegated use of an account and manage the delegated use of the account based on limitations and terms on use. In one example, service provider server 140 may be provided by PAYPAL®, Inc. of San Jose, CA, USA. However, in other embodiments, service provider server 140 may be maintained by or include another type of service provider, which may provide connection services to a plurality of users.

Service provider server 140 of FIG. 1 contains a credential storage manager (CSM) application 150, a transaction processing application 142, other applications 144, a database 146, and a network interface component 148. CSM application 150 and other applications 144 may correspond to executable processes, procedures, and/or applications with associated hardware. In other embodiments, service provider server 140 may include additional or different modules having specialized hardware and/or software as required.

CSM application 150 may correspond to one or more processes to execute modules and associated specialized hardware of service provider server 140 that provides a credential management service for service provider server 140 to manage credentials and account use during delegation of account use from one user to another, such as between a first user associated with first user device 110 and a second user associated with second user device 130. In this regard, CSM application 150 may correspond to specialized hardware and/or software of service provider server 140 to provide a convenient interface to allow the second user to access an account delegation process through second user device 130 and designate an account to provide delegated use to the first user. The second user may confirm account ownership through an authentication mechanism and entered information, and may further select terms, conditions, limitations, and parameters of use of the account by the first user during the delegated use. CSM application 150 may also determine restrictions and limitations and be used to generate a delegated use option for the first user, which may be transferred to first user device 110 based on designation of first user device 110 for the delegated use or loaded to first user device 110 based on accessible information and/or entry of an identifier or code for the delegated use.

First user device 110 may select the account to access the account on an online platform through an application on first user device 110 (e.g., browser application 120). The online platform may correspond to account usage platform 160 and the login may be user to utilize the account through the platform. CSM application 150 may perform a login on behalf of the first user in the application on first user device by securely transmitting stored credentials to first user device 110 and performing a login through a background process that hides the credentials from being viewed on first user device 110. In other embodiments, CSM application 150 may log in first user device 110 without transmitting the credentials to first user device 110, for example, through a process with account usage platform 160 that provides access to the account on first user device 110. Once first user device 110 is provided access to the account on the platform through the application, CSM application 150 may monitor the account usage by the first user through first user device 110 using a device fingerprint of first user device 110, a session ID and/or timestamp provided when logging in to the account, and/or a cookie of first user device 110's online activity through the account.

CSM application 150 may be used to determine if the delegated use of the account by the first user is within the terms set by the second user or the service provider, such as through CSM application 150. If the use is within the terms, CSM application 150 may allow the use, for example, by allowing transaction processing for a transaction through transaction processing application 142. However, in the event that an action during the delegated use of the account violates a term and is prohibited, CSM application 150 may interact with first user device 110 to prevent the action, for example, by ending the action and preventing the action through password management application 112. An interface and/or navigation on first user device 110 may be rerouted to another interface, webpage, or notification that alerts the first user of the prohibited use. If the action corresponds to a prohibited action, CSM application 150 may further alert the second user through second user device 130, and may end the delegate use of the account by the first user or allow the second user to revoke account access to the user.

Transaction processing application 142 may correspond to one or more processes to execute modules and associated specialized hardware of service provider server 140 to process a transaction through an account based on delegated use of the account to another user. In this regard, transaction processing application 142 may correspond to specialized hardware and/or software used by a second user associated with second user device 130 establish a payment account, which may be used to process transactions and delegate use to a first user associated with first user device 110. In other embodiments, the account may be generated with another online platform, such as account usage platform 160. In various embodiments, financial information may be stored to the account, such as account/card numbers and information. The account may be accessed and/or used through a browser application and/or dedicated application on first user device 110 and/or second user device 130, and engage in transaction processing through transaction processing application 142. Delegated use of the account may be provided to first user device 110, which may limit transaction processing using the account through CSM application 150.

In some embodiments, first user device 110 may generate transaction data and may communicate with transaction processing application 142 to process the transaction during delegated use of an account associated with second user device 130. Transaction processing application 142 may retrieve the financial information and may process a payment using the financial information to an account of the merchant associated with account usage platform 160 if the transaction complies with the limitations on account usage set for the delegation of use. Transaction processing application 142 may process the payment and may provide a transaction history to first user device 110 and/or second user device 130 based on transaction authorization, approval, or denial.

In various embodiments, service provider server 140 includes other applications 144 as may be desired in particular embodiments to provide features to service provider server 140. For example, other applications 144 may include security applications for implementing server-side security features, programmatic client applications for interfacing with appropriate application programming interfaces (APIs) over network 170, or other types of applications. Other applications 144 may include server interface applications for an online server platform that output data to one or more devices. For example, other applications 144 may contain software programs, executable by a processor, including a graphical user interface (GUI) configured to provide interface data for display on devices.

Service provider server 140 may further include database 146 stored in a transitory and/or non-transitory memory of service provider server 140, which may store various applications and data and be utilized during execution of various modules of service provider server 140. Database 146 may include, for example, identifiers such as operating system registry entries, cookies associated with CSM application 150 and/or other applications 144, identifiers associated with hardware of service provider server 140, or other appropriate identifiers, such as identifiers used for payment/user/device authentication or identification. In various embodiments, database 146 may include account delegation options, rules, and information, which may be used to provide account access to delegated users. Additionally, database 146 may store authentication information and other data necessary to perform a login of an account, monitor use of the account, and enforce restrictions on use during a delegated use of an account.

Service provider server 140 includes at least one network interface component 148 adapted to communicate with first user device 110, second user device 130, and/or account usage platform 160 over network 170. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Account usage platform 160 may correspond to an online platform where a user may utilize an account for delegated use for one or more actions or interactions. For example, account usage platform 160 may correspond to a merchant platform used to purchase one or items by first user device 110 when first user device 110 accesses an account associated with second user device 130 for delegated use. In some embodiments, account usage platform 160 may instead correspond to a messaging, email, social network, media playback, or other platform where a user may wish to share use of an account with another delegated user based on rules and limitations on account use, as well as prevent sharing of authentication credentials. Use of the delegated account by the delegated user on account usage platform 160 may be governed and controlled by service provider server 140, as discussed herein. Although account usage platform 160 is shown as separate from service provider server 140, the two may be combined in some embodiments.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
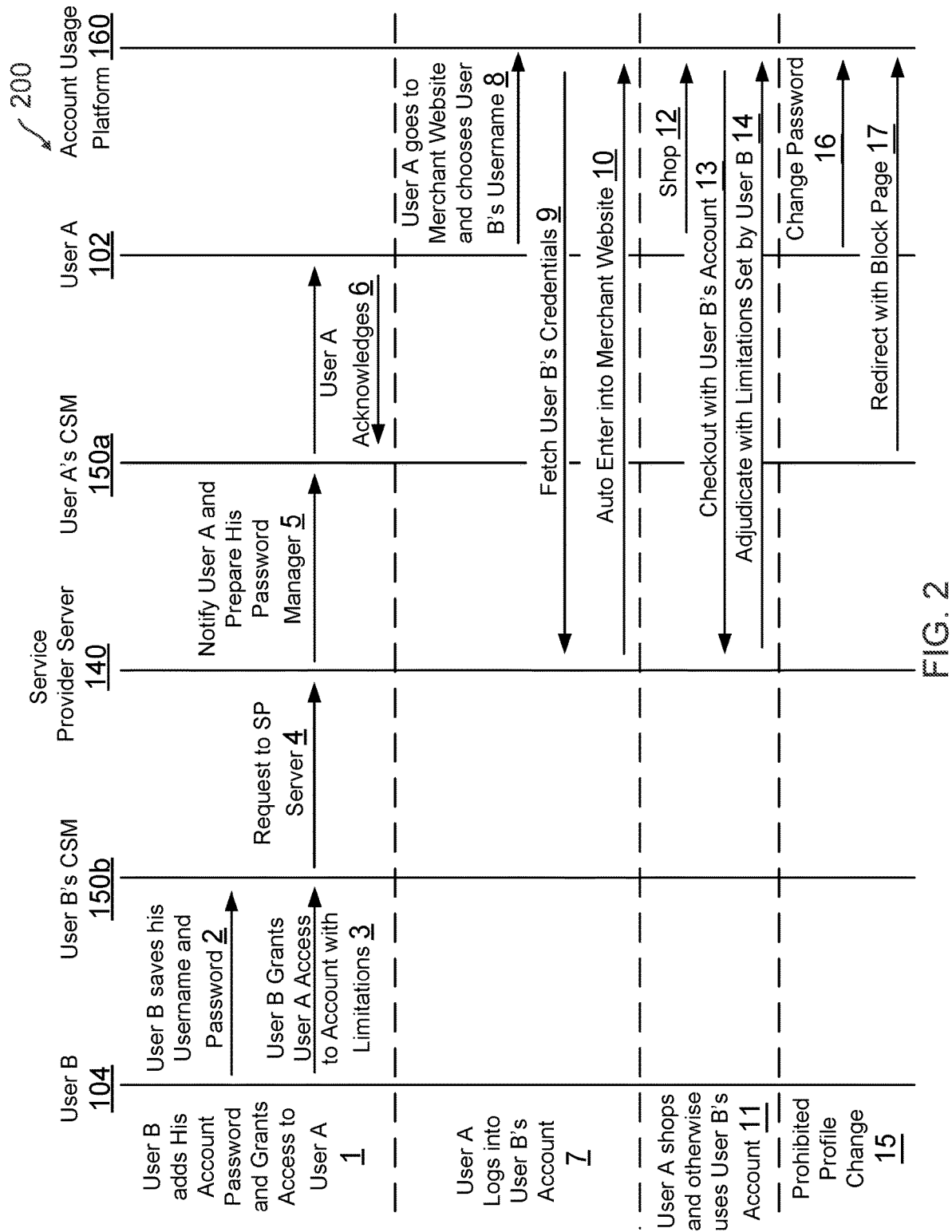
FIG. 2 is a flowchart of an exemplary process for a credential storage manager for protecting credential security during delegated account use, according to an embodiment.

FIG. 2 is a flowchart 200 of an exemplary process for a credential storage manager for protecting credential security during delegated account use, according to an embodiment. Note that one or more steps, processes, and methods described herein of flowchart 200 may be omitted, performed in a different sequence, or combined as desired or appropriate.

Flowchart 200 includes a user A 102 and a user B 104 that may interact in order to provide delegated access to a user account and utilize the user account based on the delegated access. User A 102 may be the first user utilizing first user device 110, discussed in reference to system 100 of FIG. 1, to receive delegation of account user from user B 104, such as the second user utilizing second user device 130 of system 100. In this regard, user A 102 may utilize service provider server 140 discussed in reference to system 100 of FIG. 1 to receive the delegation of account use. Service provider server 140 may provide a user A CSM 150*a* utilized by user A 102 to receive delegations of account use and monitor account usage, while service provider server 140 provides a user B CSM 150*b* used to provide delegations of account use to other users and manage those delegations. User A CSM 150*a* and user B CSM 150*b* may be implemented and provided by the processes discussed in reference to CSM application 150 in system 100 of FIG. 1, and may execute to provide and manage delegated use of accounts with a device side application, such as password management application 112 in system 100.

At step 1 of flowchart 200, user B 104 may perform a process to add their account password and grant access to user A 102. This may occur by user B 104 first saving their account username and password with user B CSM 150*b*, at step 2. The authentication credentials may be stored with user B CSM 150*b* so that user B CSM 150*b* may perform delegated logins of the account for user A 102 without user B 104 being required to directly provide authentication credentials to user A 102. At step 3, user B 104 then grants access to the account with limitations to user A 102. These limitations may be set by user B 104 through selections of terms, parameters on use, and conditions for account use, and may limit the actions performed with the account and account data accessible from the account. Limitations may also, or alternatively, be set by the service provider.

Once completed, User B CSM 150*b* may request that service provider server 140 to provide delegated account use to user A 102 and establish user A 102 as a delegated user for account use within the limitations set by user B 104 and/or the service provider. This request may establish a delegated use of user B 104's account for user A 102 so that user A CSM 150*a* may be engaged to allow delegated use of user B 104's account to user A 102. At step 5, user A 102 is notified of the availability of user B 104's account for delegated use through user A CSM 150*a*. User A CSM 150*a* may populate a notification and an option to login to the account based on a delegation of account usage. User A 102 may acknowledge, at step 6, and user A CSM 150*a* may store information necessary to allow a login to the account by user A 102.

At step 7, user A 102 may login to user B 104's account based on the account delegation previously established. In order to perform the account login based on the delegated use, user A 102 may visit a website or access an application associated with account usage platform 160, at step 8. This may include navigation to an authentication screen or interface that requests authentication credentials for the account. Since the authentication credentials are unknown to user A 102, account usage platform 160 may fetch the credentials from user A CSM 150*a*, at step 9. In some embodiments, this may include utilizing service provider server 140 to retrieve secure credentials for user B 104's account. For example, user A CSM 150*a* may have authority to utilize the account credentials but may not independently have access and/or authority to access the secure account credentials to prevent fraud. As such, user A CSM 150*a* may request that service provider server 140 provide the account credentials for user B 104's account to account usage platform 160. User A CSM 150*a* may detect the navigation to account usage platform 160 and may enter the credentials automatically or may do so on a request from user A 102 and/or account usage platform 160 to perform a login to the account for delegated use. Service provider server 140 may use the stored credentials from user B CSM 150*b* to autofill the credentials into the authentication request on account usage platform 160. Thus, user A 102 may be logged into user B 104's account with the assistance of service provider server 140.

After logging in to user B 104's account, user A 102 shops on account usage platform 160 using the account of user B 104, at step 11. At step 11, user A 102 may also perform other account actions. During a shopping action, at step 12 user A 102 may shop and select items for purchase, for example, by adding the items to a digital shopping cart. At step 13, checkout is requested using the account for user B 104. Checkout may be requested with service provider server 140 using the account to provide a payment for the items selected for purchase. Service provider server 140 checks the limitations on the delegated account use with account usage platform 160 and/or the transaction on account usage platform 160, at step 14. This may adjudicate the limitations and determine whether transaction processing can proceed. If no limitations are violated, the transaction may be processed; however, if a limitation is violated, service provider server 140 may prevent transaction processing and may alert user A 102 and/or user B 104 of the violation. Similarly, if user A 102 attempts to make a prohibited profile change, at step 15, such as by accessing a change password process with account usage platform 160, at step 16, user A CSM 150*a* with service provider server 140 may detect the requested account profile change. Thus, at step 17, user A CSM 150*a* may instead redirect the requested navigation to a block page that alerts user A 102 of the prohibited use. User A CSM 150*a* and/or service provider server 140 may alert user B 104 through user B CSM 150*b* of the prohibited request.

Figure 3:
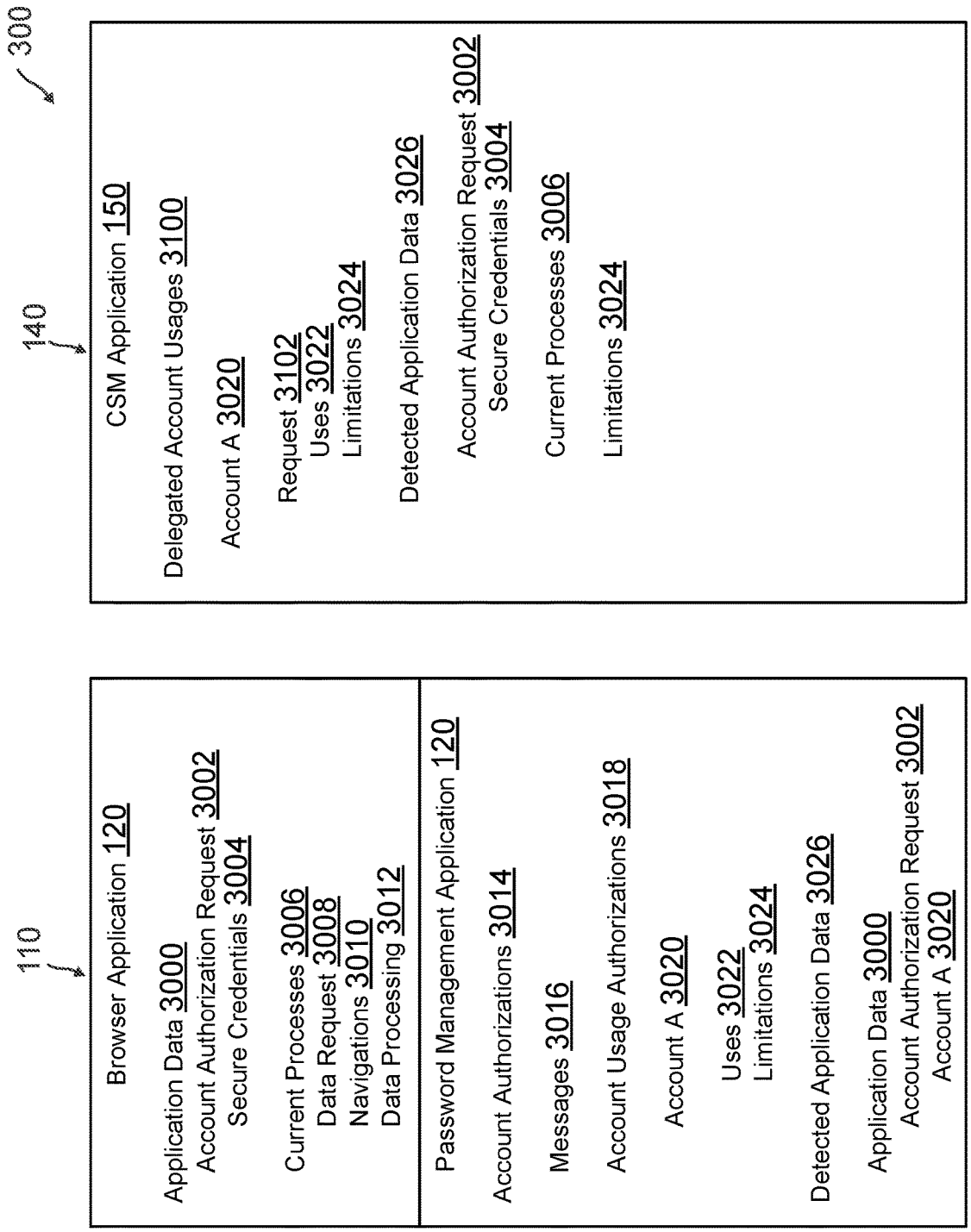
FIG. 3 is an exemplary system environment where a user device and a transaction processor server may interact to establish and use a credential storage manager, according to an embodiment.

FIG. 3 is an exemplary system environment where a user device and a transaction processor server may interact to establish and use a credential storage manager, according to an embodiment. FIG. 3 includes first user device 110 and service provider server 140 discussed in reference to system 100 of FIG. 1.

In environment 300, service provider server 140 executes CSM application 150 corresponding generally to the processes and features discussed in reference to system 100 of FIG. 1. In this regard, CSM application 150 may be used to delegate account usage to first user device 110 so that a first user associated with first user device 110 may access an account and utilize the account based on the delegated usage. For example, CSM application 150 includes delegated account usages 3100, which includes delegation of account A 3020 to the first user. This delegation may be based on a request 3102 from a second user that controls, manages, or owns account A 3020. Request 3102 may also designate uses 3022 of account A 3020 and limitations 3024 of use of account A 3020. Uses 3022 may designate required or suggested uses of account A 3020 while limitations 3024 may prevent certain uses and data accesses for account A 3020.

When providing delegated use of account A 3020 to first user device 110, CSM application may receive detected application data 3026 on browser application 120. Further in environment 300, first user device 110 executes browser application 120 and password management application 112 corresponding generally to the processes and features discussed in reference to system 100 of FIG. 1. Password management application 112 may be implemented to provide notifications associated with the delegated account usage and enforce limitations 3024 on account usage. For example, password management application 112 may receive account authorizations 3014 for delegated account usage and display messages 3016 that allow the first user to be notified that they may utilize an account of a second user.

Account usage authorizations 3018 may include one for account A 3020 and include uses 3022 and limitations 3024.

Browser application 120 may be used to generate application data 3000, such as an account authentication request 3002 that may be detected and provided to CSM application 150. For example, password management application 112 may access detected application data 3026 of application data 3000 having account authentication request 3002, and provide the data to CSM application 150. Secure credentials 3004 may be provided to browser application 120, such as through password management application 112, to perform a secure login based on account authentication request 3002 in browser application 120. CSM application 150 may also be used to detect current processes 3006, such as data requests 3008, navigations 3010, and data processing 3012 in browser application 120, and enforce limitations 3024 on current processes 3006.

Figure 4:
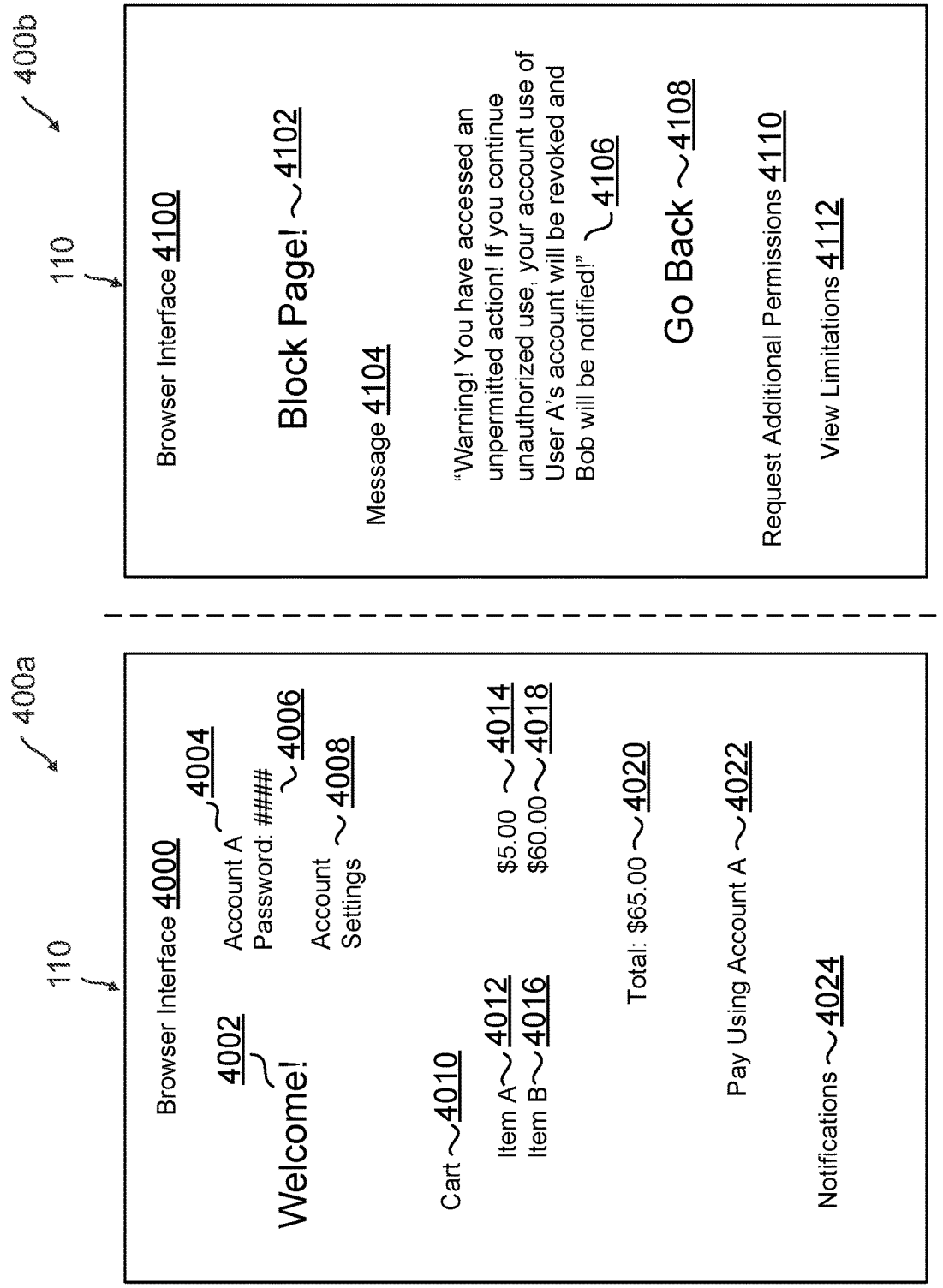
FIG. 4A is an exemplary application interface for delegated account usage through a credential storage manager, according to an embodiment.
FIG. 4B is an exemplary application interface displaying a block notification to a delegated user when the delegated user attempts to access sensitive information, according to an embodiment.

FIG. 4A is an exemplary application interface for delegated account usage through a credential storage manager, according to an embodiment. Environment 400a of FIG. 4A includes a browser interface 4000 that may be displayed by a user device, such as first user device 110 discussed in reference to system 100 of FIG. 1. Browser interface 4000 may be provided by a device application after accessing an account based on delegated use of the account. Thus, browser interface 4000 may be utilized to perform one or more actions during delegated use of an account based on terms and limitations on account usage.

In environment 400a, browser interface 4000 displays a login and shopping screen as would be seen when a user device accesses an account of another user based on delegated usage of the account. For example, browser interface 4000 includes a welcome message 4002 for a delegated user viewing browser interface 4000. Welcome message 4002 may be displayed with username 4004 for account A and a password field 4006 that shows a hidden password that is not revealed to the delegated user. Password field 4006 may be automatically filled by a CSM of a service provider and may prevent revealing of authentication credentials to the delegated user. Additionally, username 4004 and password field 4006 may be displayed with account settings 4008. However, selection of account settings 4008 may be inaccessible to the delegated user and/or selection may result in navigation to a block page, such as the block page shown in FIG. 4B.

While using account A, the delegated user may generate a cart 4010 having an item A 4012 with a cost 4014 and an item B having a cost 4018. A total 4020 may be generated based on cart 4010 and the delegated user may perform electronic transaction processing 4022 using account A based on the delegated use. Notifications 4024 may also be displayed to the delegated user based on cart 4010 and/or other information for the delegated use. For example, if item A 4012, item B 4016, and/or total 4020 violate one of the rules on transaction processing set by the owner of account A, notifications 4024 may be displayed for the delegated user to update cart 4010 to make sure cart 4010 and electronic transaction processing 4022 comply with the limitations. For example, cost 4018 may be over an allowed amount and notifications 4024 may inform the delegated user to remove item B 4016 from cart 4010 and/or select another item.

FIG. 4B is an exemplary application interface displaying a block notification to a delegated user when the delegated user attempts to access sensitive information, according to an embodiment. Environment 400a of FIG. 4A includes a browser interface 4000 that may be displayed by a user device, such as first user device 110 discussed in reference to system 100 of FIG. 1. Browser interface 4000 may be provided by a device application after performing an unauthorized account action during a delegated account use by a user. Thus, browser interface 4000 may be displayed to inform the delegated user that the user's activity with the account is in violation and prohibited by one or more limitations on account use.

In environment 400a, browser interface 4100 may display a notification or alert in response to an unauthorized account action, such as if the delegated user attempts to access unauthorized data, change account data, and/or utilize the account in an unauthorized manner (e.g., over a transaction processing limit). Thus, a block page 4102 may be displayed to the delegated user in response to the unauthorized account action. Block page 4102 may include a message 4104 displayed to the user. For example, message 4104 includes content stating: "Warning! You have accessed an unpermitted action! If you continue unauthorized use, your account use of Bob's account will be revoked and Bob will be notified!" Content 4106 may inform the delegated user that the activity is prohibited and that the user should end the activity before their delegation of account use is revoked. In some embodiments, block page 4102 may be displayed through a browser extension or another application associated with the delegated use, and may be pushed to the device by a service provider server or output by the extension/application in response to detecting the unauthorized use based on known limitations on account use.

Block page 4102 also includes a navigation option 4108 that allows the delegated user to reverse navigation to the unauthorized process or data. This navigation option 4108 may be used to revert to a previously allowed interface or leave and return to a welcome screen that is allowed by the delegated account usage. In response to block page 4102, the delegated user may also wish to receive additional permissions to allow for the unauthorized use, such as if the delegated user needs to purchase an item over an allowed threshold. In this regard, block page 4102 may also include a request additional permissions option 4110 to request those permissions from the owner of the account. The delegated user may also select a view limitations option 4112 that allows the delegated user to view the limitations that caused block page 4102 and other limitations on account usage.

Figure 5:
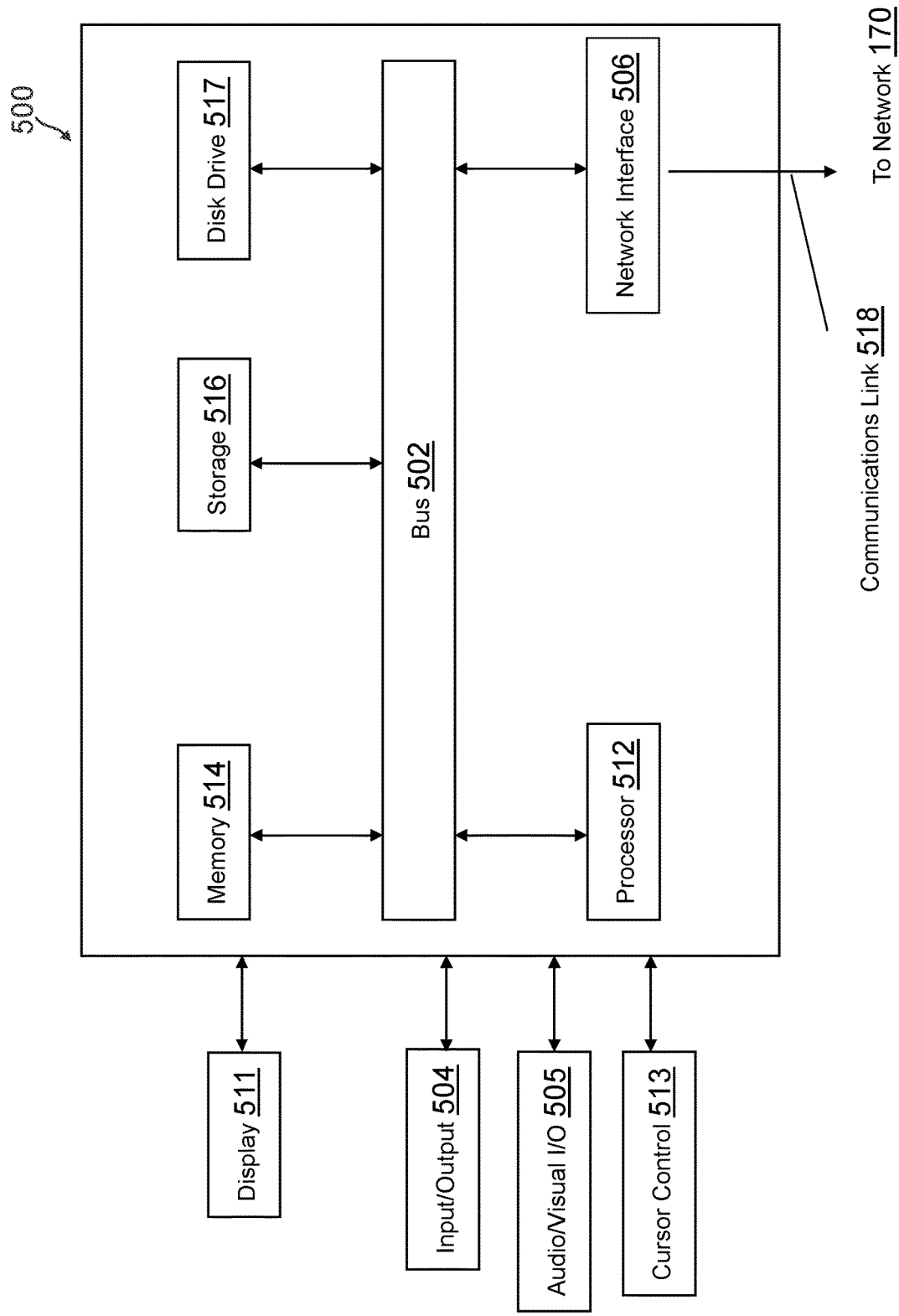
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
  determining an authorization for a use of an account by a first user, wherein the account is associated with a second user;
  receiving a request for the use of the account in an application on the system with a transaction processing application of an online service provider;
  fetching an account credential for the account from the online service provider associated with the account;
  responsive to the request, entering the account credential to an authentication process for the account in the application while preventing viewing of the account credential by the first user;
  providing device data for a device fingerprint to the online service provider, wherein the device fingerprint is usable to track the use of the account in the application during a login session in the application;
  monitoring, using the device fingerprint, the login session of the account in the application for one or more transactions processed using the account with the transaction processing application of the online service provider;
  enforcing, based on the device data and the monitoring, an authorization condition during the login session for processing the one or more transactions in the application using the account, wherein the authorization condition associated with the use of the account for one or more transactions; and
  logging out of the account in the application automatically on an expiration or a violation of the authorization condition for the authorization.

2. The system of claim 1, wherein the operations further comprise:
detecting a navigation request to access a prohibited account action for the first user; and
causing a redirect to a message alerting the first user of the prohibited account action.

3. The system of claim 2, wherein the prohibited account action comprises one of a password change action, a password reset action, or a view request for financial information stored with the account.

4. The system of claim 1, wherein the use of the account by the first user comprises one or more restrictions.

5. The system of claim 4, wherein the one or more restrictions include at least one of a time limit on the use of the account, a purchase amount limit on a purchase made by the first user using the account, a website use limit for a login of the account on a website, an application use limit for the login of the account in an application, or an account access limitation to a service provided by the account.

6. The system of claim 5, wherein the operations further comprise:
   determining that at least one of the one or more restrictions exists; and
   in response to determining that at least one of the one or more restrictions exists, deleting the account credential.

7. The system of claim 6, wherein the operations further comprise using a cookie to track the use of the account, wherein the at least one of the one or more restrictions is determined to exist based on the cookie.

8. A method comprising:
   determining, by a password management application, an authorization for a use of an account by a first user, wherein the account is associated with a second user;
   receiving, by the password management application, a request for the use of the account in an application on a computing device with a transaction processing application of an online service provider;
   fetching, by the password management application, an account credential for the account from the online service provider associated with the account;
   responsive to the request in the application, entering, by the password management application, the account credential to an authentication process for the account in the application while preventing viewing of the account credential by the first user;
   transmitting a device fingerprint to the online service provider for tracking the use of the account in the application during a login session;
   monitoring, using the device fingerprint, the login session of the account in the application for one or more transactions processed using the account with the transaction processing application of the online service provider, wherein the monitoring includes enforcing an authorization condition during the login session for processing the one or more transactions in the application using the account; and
   logging out of the account in the application automatically on an expiration or a violation of the authorization condition for the authorization.

9. The method of claim 8, further comprising:
   detecting a navigation request to access a prohibited account action for the first user; and
   causing a redirect to a message alerting the first user of the prohibited account action.

10. The method of claim 9, wherein the prohibited account action comprises one of a password change action, a password reset action, or a view request for financial information stored with the account.

11. The method of claim 8, wherein the use of the account by the first user comprises one or more restrictions.

12. The method of claim 11, wherein the one or more restrictions include at least one of a time limit on the use of the account, a purchase amount limit on a purchase made by the first user using the account, a website use limit for a login of the account on a website, an application use limit for the login of the account in an application, or an account access limitation to a service provided by the account.

13. The method of claim 12, further comprising:
   determining that at least one of the one or more restrictions exists; and
   in response to determining that at least one of the one or more restrictions exists, deleting the account credential.

14. The method of claim 12, further comprising using a cookie to track the use of the account, wherein the at least one of the one or more restrictions is determined to exist based on the cookie.

15. A non-transitory machine-readable medium having stored thereon machine-readable instructions executable to cause a machine to perform operations comprising:
   determining an authorization for a use of an account by a first user, wherein the account is associated with a second user;
   receiving a request for the use of the account in an application on the machine with a transaction processing application of an online service provider;
   fetching an account credential for the account from the online service provider associated with the account;
   responsive to the request in the application, entering the account credential to an authentication process for the account in the application while preventing viewing of the account credential by the first user;
   providing, for the online service provider to track the use of the account in the application during a login session, device data for a device fingerprint to the online service provider;
   monitoring, using the device fingerprint, an authorization condition associated with the use of the account during the login session of the account in the application, wherein the authorization condition is monitored for compliance when processing one or more transactions using the account; and
   logging out of the account in the application automatically on an expiration or a violation of the authorization condition for the authorization.

16. The non-transitory machine-readable medium of claim 15, wherein the operations further comprise:
   detecting a navigation request to access a prohibited account action for the first user; and
   causing a redirect to a message alerting the first user of the prohibited account action.

17. The non-transitory machine-readable medium of claim 16, wherein the prohibited account action comprises one of a password change action, a password reset action, or a view request for financial information stored with the account.

18. The non-transitory machine-readable medium of claim 15, wherein the use of the account by the first user comprises one or more restrictions.

19. The non-transitory machine-readable medium of claim 18, wherein the one or more restrictions include at least one of a time limit on the use of the account, a purchase amount limit on a purchase made by the first user using the account, a website use limit for a login of the account on a website, an application use limit for the login of the account in an application, or an account access limitation to a service provided by the account.

20. The non-transitory machine-readable medium of claim 19, wherein the operations further comprise:
   determining that at least one of the one or more restrictions exists; and in response to determining that at least one of the one or more restrictions exists, deleting the account credential.

\* \* \* \* \*